(12) United States Patent
Yin (10) Patent No.: US 7,451,859 B2
(45) Date of Patent: Nov. 18, 2008

(54) MAGNETIC DAMPING DEVICE

(76) Inventor: Yen-Piao Yin, 1F., No. 79-1, Jhouzih St., Neihu District, Taipei (TW)

( * ) Notice: Subject to any disclaimer, the term of this patent is extended or adjusted under 35 U.S.C. 154(b) by 0 days.

(21) Appl. No.: 11/544,031

(22) Filed: Oct. 6, 2006

(65) Prior Publication Data

US 2008/0083589 A1  Apr. 10, 2008

(51) Int. Cl.
*F16F 15/03* (2006.01)
(52) U.S. Cl. .................. 188/267; 188/161; 188/164
(58) Field of Classification Search ............... 188/267, 188/83, 164, 161, 79.54, 79.58; 482/63, 482/903
See application file for complete search history.

(56) References Cited

U.S. PATENT DOCUMENTS

| | | | | |
|---|---|---|---|---|
| 2,436,880 A | * | 3/1948 | Burgett | 188/171 |
| 5,711,404 A | * | 1/1998 | Lee | 188/164 |
| 5,848,953 A | * | 12/1998 | Wei et al. | 482/63 |
| 5,851,165 A | * | 12/1998 | Wei et al. | 482/63 |
| 6,345,703 B1 | * | 2/2002 | Peng | 188/164 |
| 6,585,087 B2 | * | 7/2003 | Lin | 188/164 |
| 6,719,107 B1 | * | 4/2004 | Chen | 188/164 |
| 2006/0201762 A1 | * | 9/2006 | Lai | 188/267 |

FOREIGN PATENT DOCUMENTS

DE   20 2005 003 788 U1  *  6/2005

* cited by examiner

*Primary Examiner*—Robert A. Siconolfi
*Assistant Examiner*—Vu Q Nguyen
(74) *Attorney, Agent, or Firm*—Troxell Law Office, PLLC (57) ABSTRACT

A magnetic damping device comprises a frame, a load wheel, two magnetic means, and a damping adjusting mechanism, wherein these two magnetic means have two arched plates that coaxially couple with each other by a connection shaft for synchronously adjusting the magnetic damping force. The damping adjusting mechanism has the structure for providing multi-sectional adjustment and for fine adjusting the magnetic damping force so as to provide the product with stable and uniform quality. As a result, the product can be maintained and tested easily.

3 Claims, 9 Drawing Sheets

MAGNETIC DAMPING DEVICE

FIELD OF THE INVENTION

The present invention relates to a magnetic damping device for an exercising machine such as a rowing exerciser, a step exerciser, or a weight lifting exerciser, and more particularly to a magnetic damping device capable of providing synchronous movement and fine adjusting the magnetic damping force so as to achieve the purposes of equally distributing the magnetic damping force and exactly controlling the magnetic damping force.

BACKGROUND OF THE INVENTION

A general magnetic damping device for an exercising machine comprises two independent magnetic means and a magnetic plate disposed inside a load wheel. The magnetic means comprise arched plates, magnets, and tensile springs, wherein first ends of the tensile springs are connected to the arched plates and the second ends of the tensile springs are connected to the magnetic plate. By rotating and tightening the external adjusting knob, a steel rope is pulled to allow the arched plates and the magnets to approach the load wheel for increasing the magnetic damping force. By rotating and loosening the external adjusting knob, the arched plates and the magnets are pulled back by the tensile springs to depart from the load wheel for decreasing the magnetic damping force.

The conventional magnetic damping device has the magnetic plate and the tensile springs. However, the magnetic damping device has no structure for fine adjustment. As a result, it is very hard to provide the gaps between the magnets and the load wheel with accurate steady distances. Accordingly, the product has unstable quality and poor maintenance.

SUMMARY OF THE INVENTION

A main object of the present invention is to provide a magnetic damping device capable of fine adjusting the magnetic damping force to provide the gaps between the magnets and the load wheel with more accurate steady distances. As a result, the product can be manufactured, maintained, and tested easily.

Another object of the present invention is to provide a magnetic damping device having synchronous driven structure so as to achieve the purposes of equally distributing the magnetic damping force and exactly controlling the magnetic damping force.

Moreover, the magnetic damping device of the present invention has simplified structure since it does not require the conventional magnetic plate and tensile springs.

DETAILED DESCRIPTION OF THE PREFERRED EMBODIMENT

Referring to FIG. 1 through FIG. 4, a magnetic damping device of the present invention comprises a frame 1, a load wheel 2, two magnetic means 3, and a damping adjusting mechanism 4.

The above-mentioned frame 1 is designed to be disposed on an exercising machine, which is driven by the manpower. In addition, a wheel 21 is coaxially fixed on the load wheel 2, and coupled with the exercising machine via a belt such that the magnetic damping force generated by the rotation of the load wheel 2 can provide the resistance required in the exercise.

The above-mentioned magnetic means 3 comprise two arched plates 31 and several magnets 32 mounted on the arched plates 31. As shown in FIGS. 1 through 4, these two arched plates 31 are coaxially coupled with each other, and the respective axial connection ends 311 of the arched plates 31 are axially coupled with each other by a connection shaft 33, wherein the arched plates 31 are also connected to the frame 1 in such a manner that the arched plates 31 can be angularly shifted about the connection shaft 33 so as to adjust the gaps between the magnets 32 and the load wheel 2. Besides, the arched plates 31 further have respective shiftable ends 312 corresponding to the axial connection ends 311.

Figure 1:
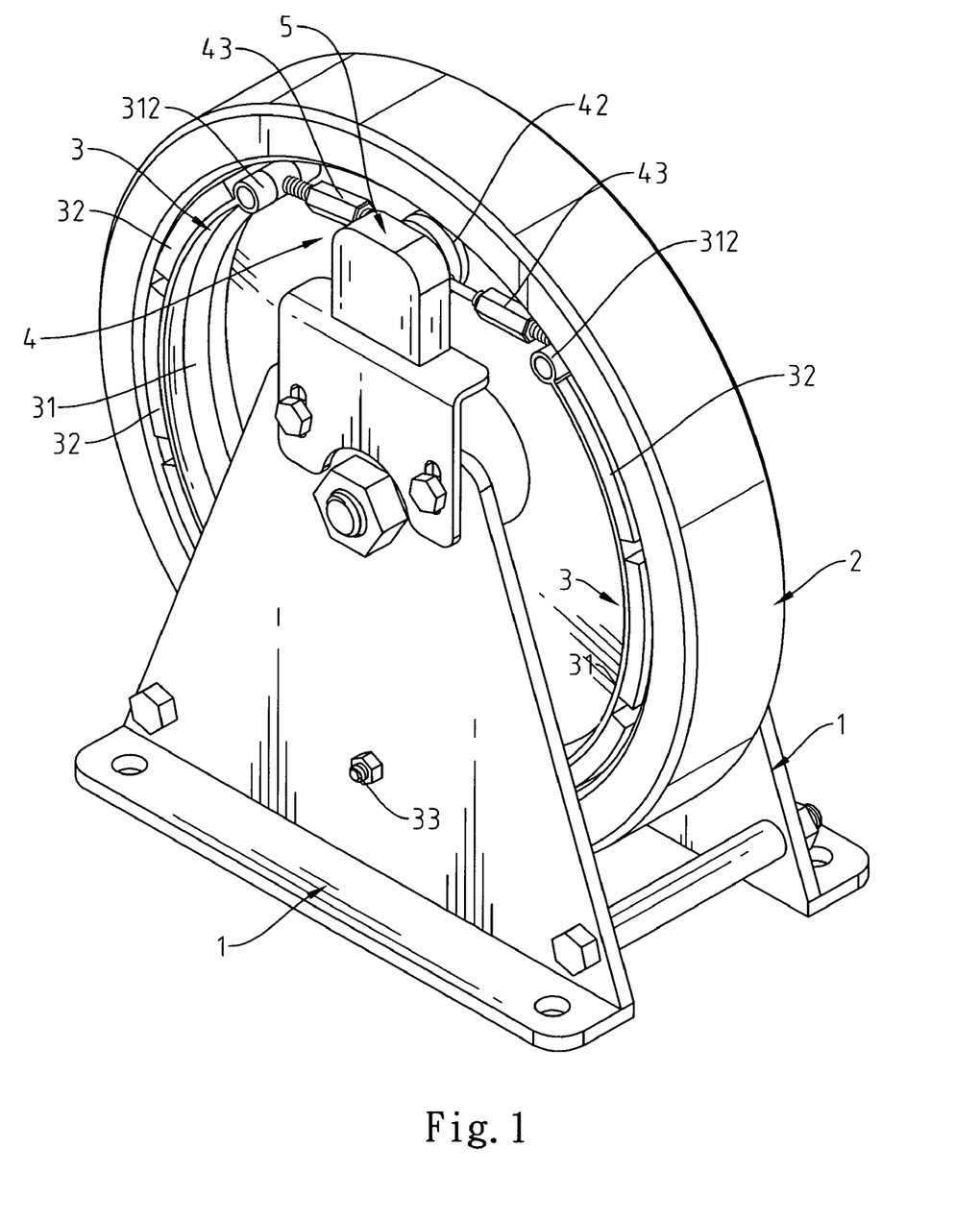
FIG. 1 is an assembled, elevational view of the present invention.
Figure 2:
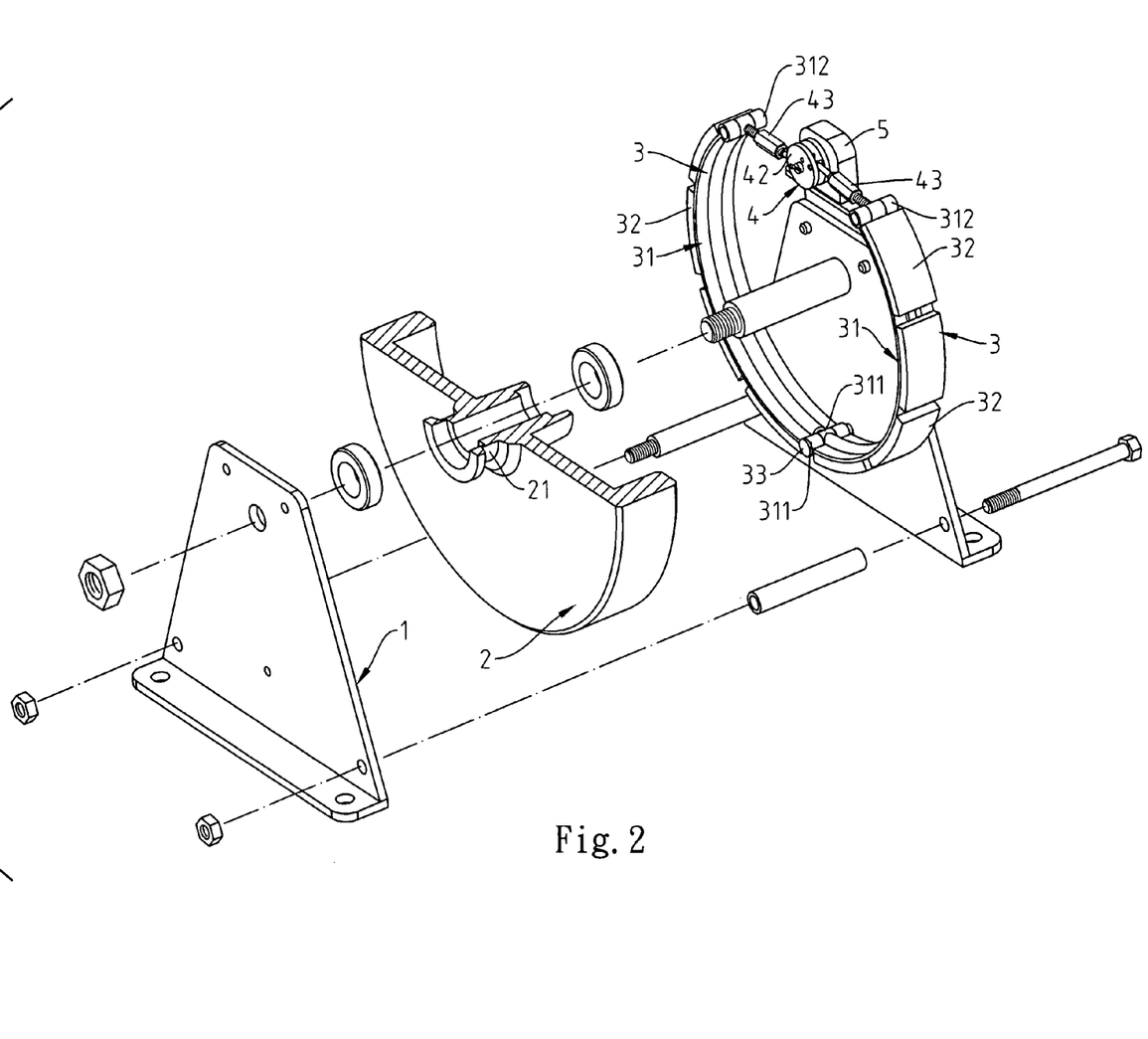
FIG. 2 is an elevational, decomposed view of the present invention.
Figure 3:
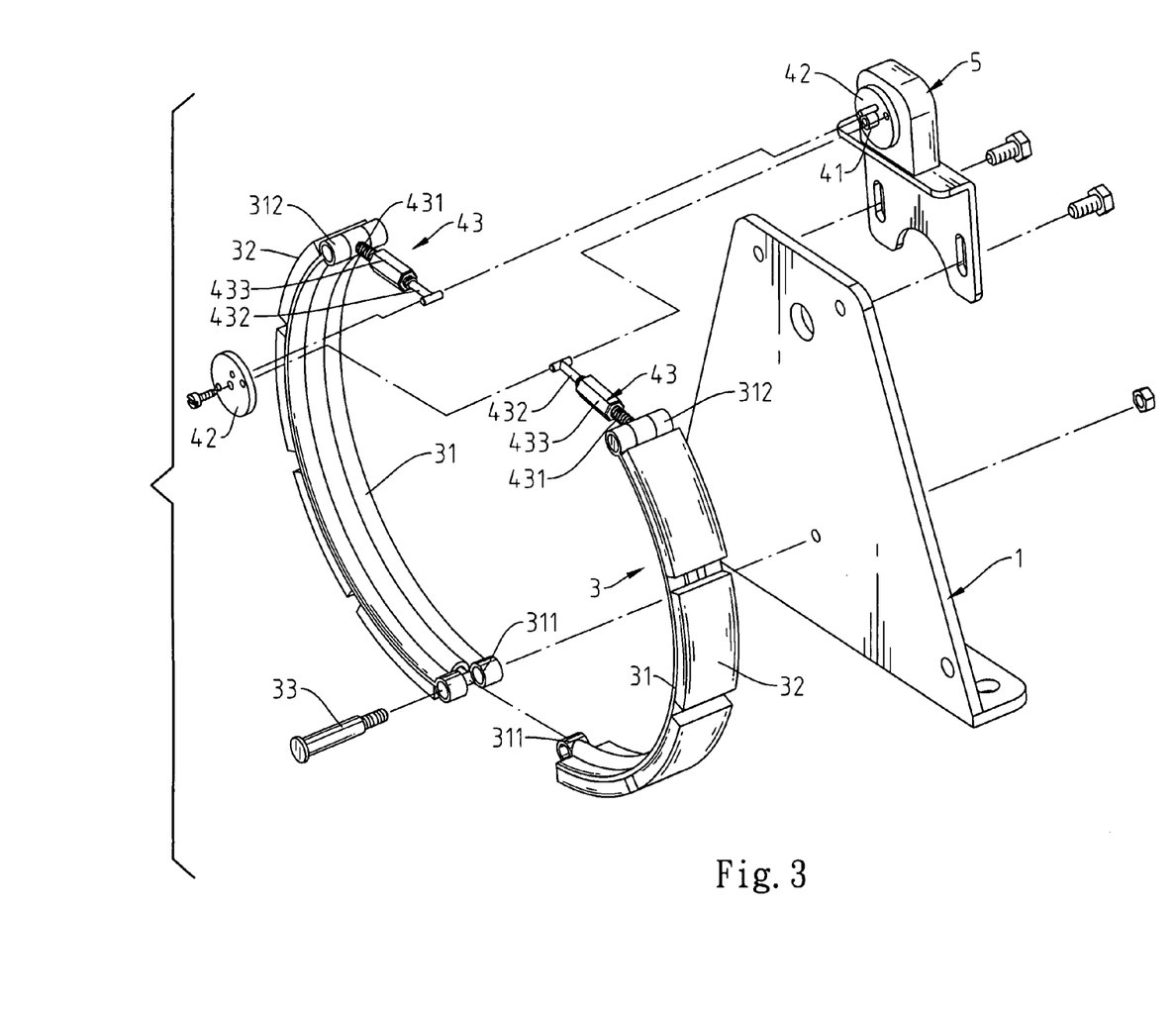
FIG. 3 is an elevational, decomposed view showing the magnetic means and the damping adjusting mechanism of the present invention.

Referring to FIGS. 1 through 4, the above-mentioned damping adjusting mechanism 4 comprises a rotation shaft 41, a rotation plate 42, and two adjustable rods 43. Referring to FIG. 3, the rotation plate 42 is fixed on the rotation shaft 41 to be rotatable about the rotation shaft 41. The adjustable rods 43 are axially coupled with the shiftable ends 312 of the arched plates 31 by respective outer ends. The respective inner ends of the adjustable rods 43 are axially and oppositely connected to the equidistant positions of the rotation plate 42. As a result, when the rotation plate 42 is rotated by the rotation shaft 41, these two adjustable rods 43 can be synchronously, sectionally shifted.

Figure 5:
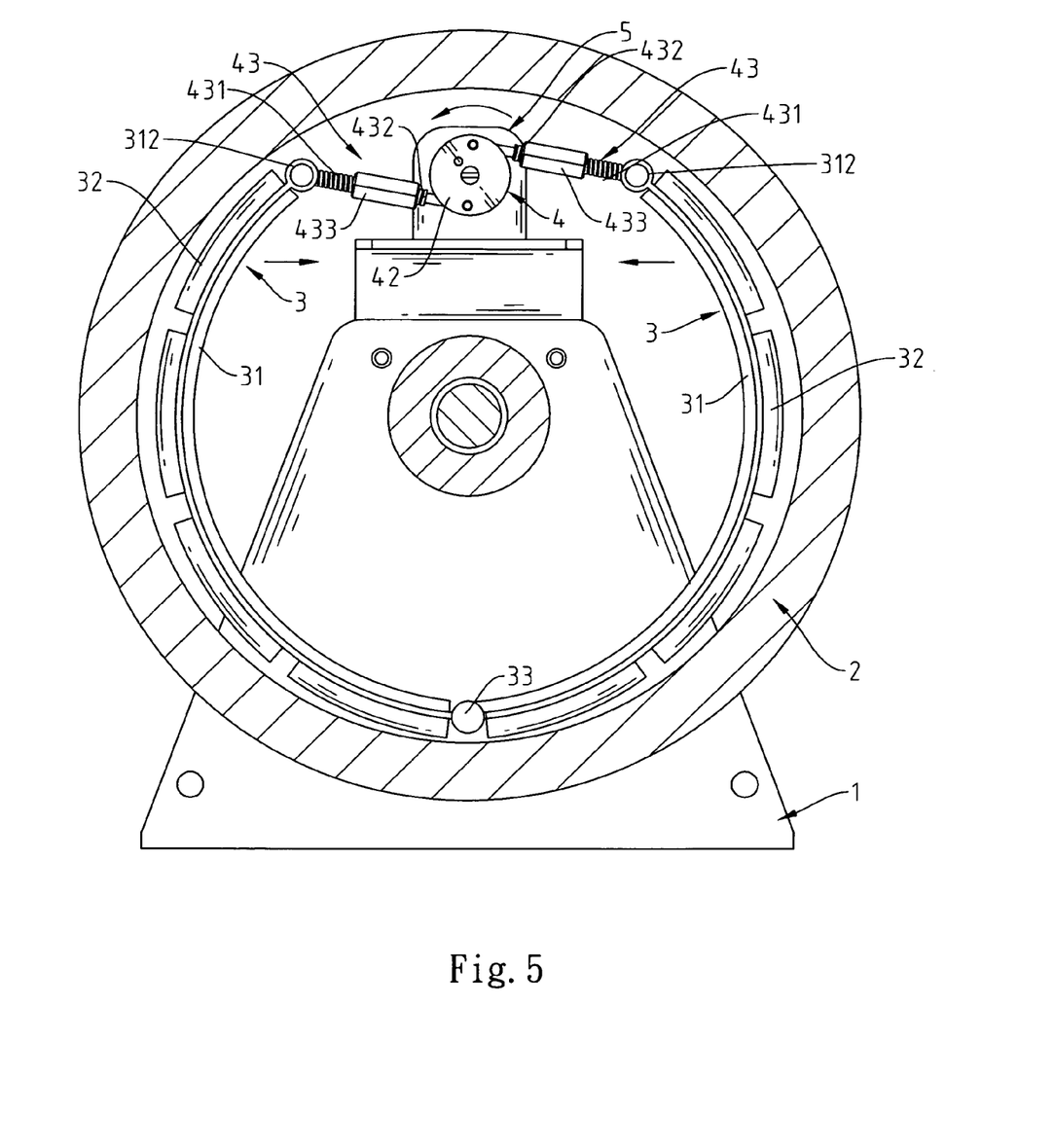
FIG. 5 is schematic, planar view showing that the damping adjusting mechanism of the present invention adjusts the magnetic damping force of the magnetic means.

As shown in FIG. 5, when the rotation plate 42 rotates and pulls the adjustable rods 43, the adjustable rods 43 can pull the shiftable ends 312 of the arched plates 31 to enable the arched plates 31 to make the angular displacement about the connection shaft 33 so as to enlarge the gaps between the magnets 32 and the load wheel 2. In other words, the magnetic damping force applied to the load wheel 2 is decreased during the rotation of the load wheel 2.

Figure 6:
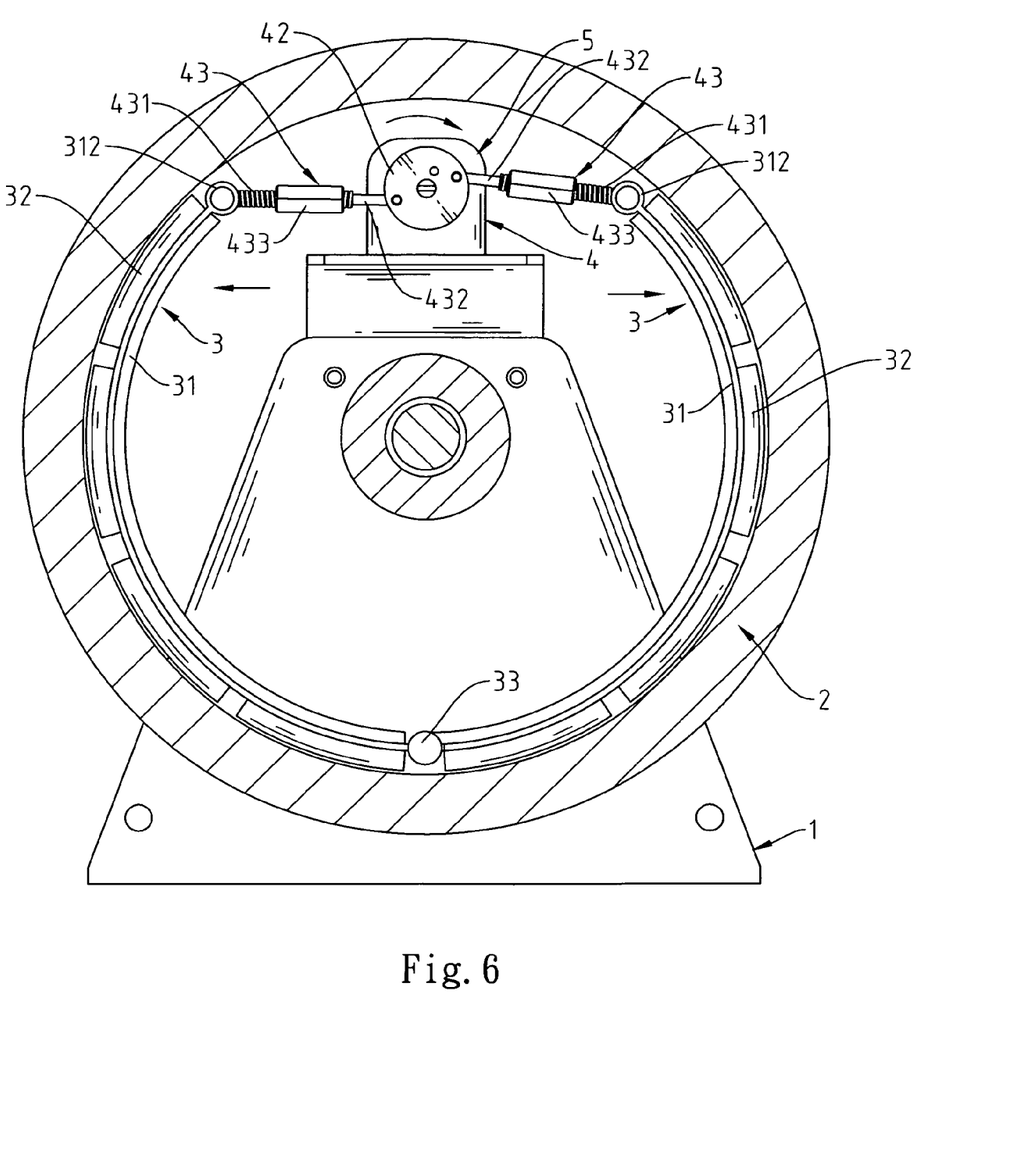
FIG. 6 is schematic, planar view showing that the damping adjusting mechanism of the present invention adjusts the magnetic damping force of the magnetic means in a direction opposite to that shown FIG. 5.

As shown in FIG. 6, when the rotation plate 42 rotates reversely for pushing the adjustable rods 43, the adjustable rods 43 can push the shiftable ends 312 of the arched plates 31 so as to decrease the gaps between the magnets 32 and the load wheel 2. In other words, the magnetic damping force applied to the load wheel 2 is increased during the rotation of the load wheel 2. Furthermore, when the rotation plate 42 rotates toward the direction for pushing the adjustable rods 43, the shiftable ends 312 of the arched plates 31 can pull the adjustable rods 43 by the use of the magnetic attraction between the magnets 32 of the arched plates 31 and the load wheel 2.

Referring to FIGS. 1 through 6, in order to enable the rotation shaft 41 and the rotation plate 42 to be sectionally rotated toward different directions, the rotation shaft 41 is connected to a motor 5, wherein the motor 5 is fixed on the frame 1. The motor 5 is multi-sectionally and angularly shiftable so that the gaps between the magnets 32 and the load wheel 2 are adjustable so as to achieve the purpose of adjusting the magnetic damping force multi-sectionally.

Figure 7:
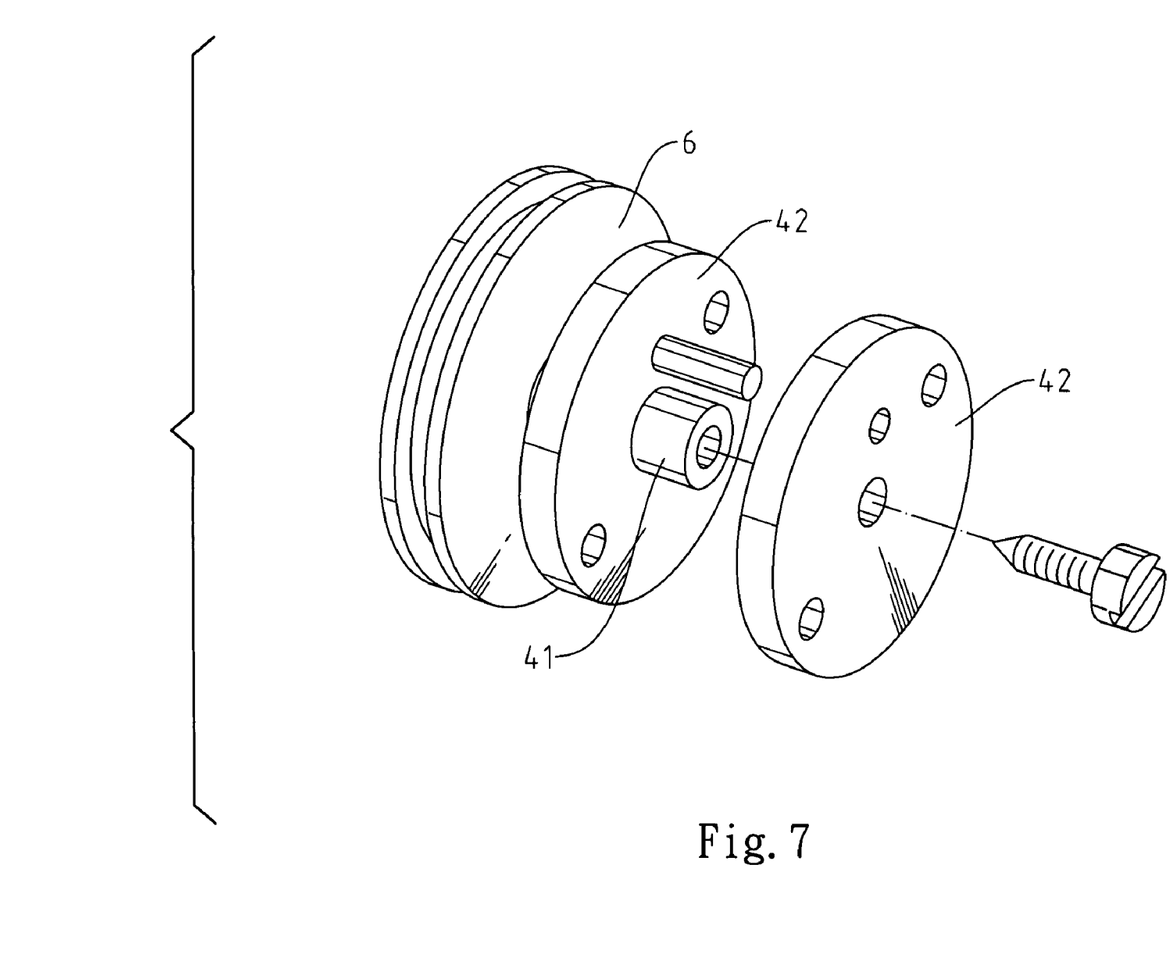
FIG. 7 is a partial elevational view showing another preferred embodiment of the damping adjusting mechanism of the present invention.
Figure 8:
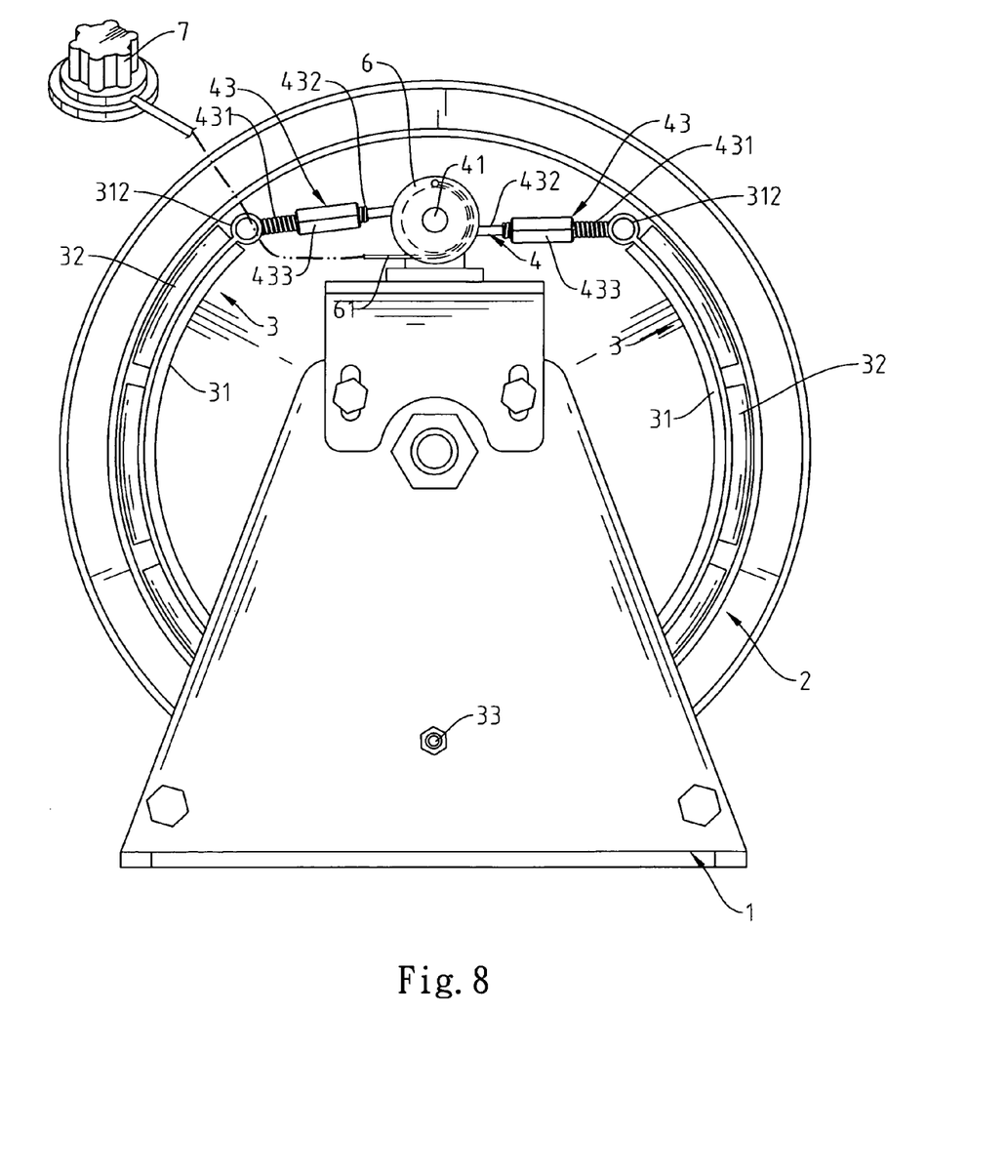
FIG. 8 is a schematic planar view showing the usage status of the damping adjusting mechanism shown in FIG. 6.

Referring to FIGS. 7 and 8, in this preferred embodiment, the rotation plate 41 is connected to a wheel 6, and the wheel 6 is wound by a steel rope 61 so that when an adjusting knob 7 pulls the steel rope 61 by rotation, the wheel 6 can be driven for rotation. On the contrary, when the adjusting knob 7 is released by rotation, the shiftable ends 312 of the arched plates 31 can pull the adjustable rods 43 by the use of the magnetic attraction between the magnets 32 and the load wheel 2 so that the rotation plate 42, the rotation shaft 41, and the rotation wheel 6 can be rotated together. The abovementioned adjusting knob 7 has the conventional structure and has the function for providing multi-sectional adjustment so as to multi-sectionally adjust the magnetic damping force.

Figure 9:
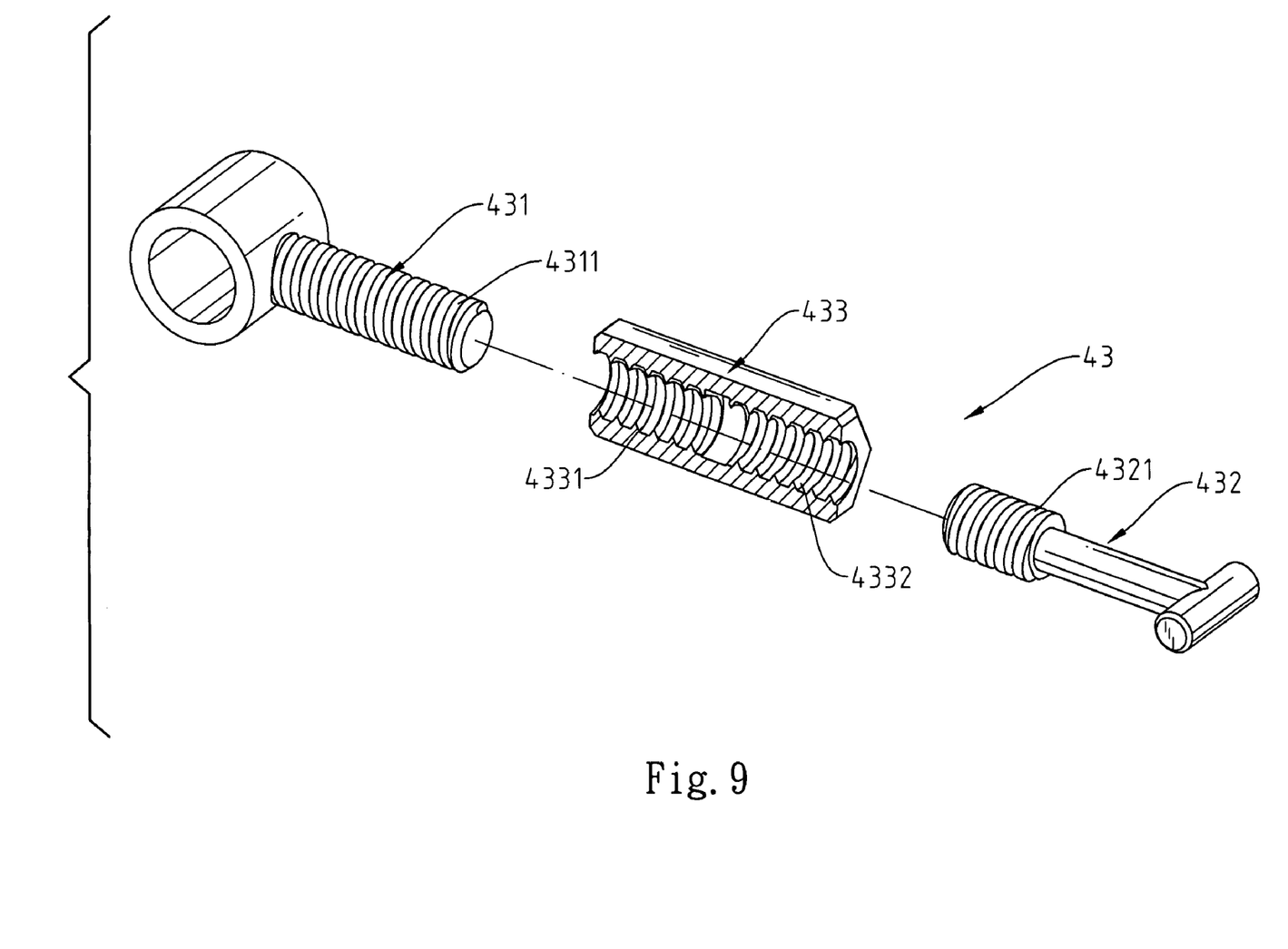
FIG. 9 is a decomposed, elevational view showing the partial cross-section of the adjustable rods of the damping adjusting mechanism of the present invention.

Referring to FIG. 9, the adjustable rods 43 of the present invention can be adjusted to have a longer or shorter length. In this preferred embodiment, each of the adjustable rods 43 has two connection rods 431, 432 and a dual-side nut 433, wherein the connection rods 431, 432 have opposite directional threads on respective threaded ends 4311, 4321. The dual-side nut 433 also has female threads 4331, 4332 having respective threading directions opposite to that of the threaded ends 4311, 4321. As a result, the connection rods 431, 432 are allowed to shift toward the inside or the outside by rotating the dual-side nut 433 so as to shorten or lengthen the adjustable rods 43.

Figure 4:
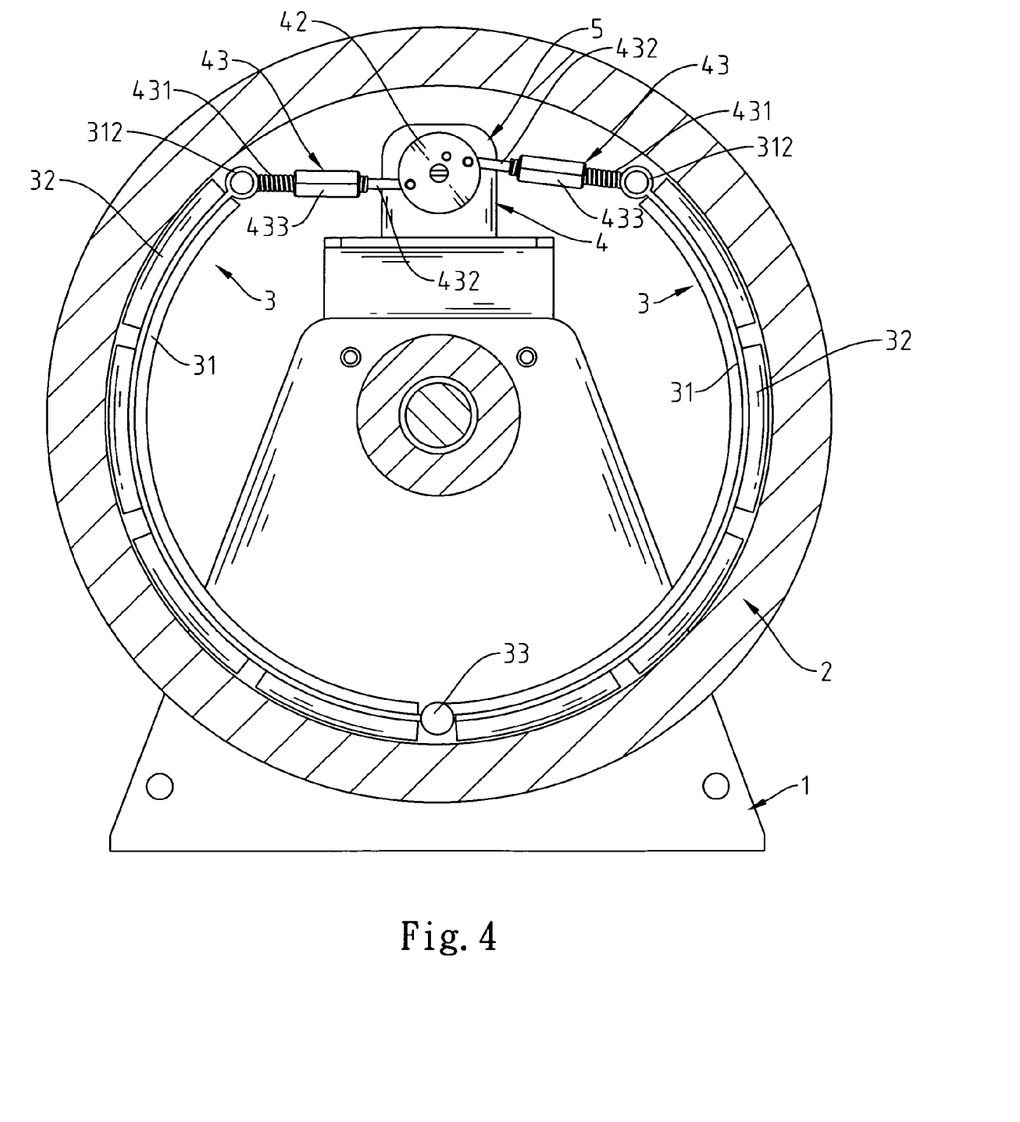
FIG. 4 is a planar, partial-sectional view of the present invention.

Referring to FIGS. 4 and 9, the gaps between the magnets 32 and the load wheel 2 are adjustable to further adjust the magnetic damping force by shortening or lengthening the length of the adjustable rods 43. For example, the lengths of the adjustable rods 43 can be shorten by rotation so that the adjustable rods 43 can pull the shiftable ends 312 of the arched plates 31 so as to enlarge the gaps between the magnets 32 and the load wheel 2. In other words, the magnetic damping force applied to the load wheel 2 can be decreased. On the contrary, if the lengths of the adjustable rods 43 are lengthened by rotation, the gaps between the magnets 32 and the load wheel 2 are decreased so as to increase the magnetic damping force applied to the load wheel 2.

Therefore, the present invention can fine adjust the magnetic damping force by adjusting the length of the adjustable rods 43 so as to fine adjust the product and provide the product with stable and uniform quality so that the product can be maintained and tested easily.

Furthermore, as shown in FIGS. 5 and 6, the arched plates 31 of the magnetic means 3 are coaxially coupled with each other by the connection shaft 33 so as to allow the magnetic means 3 to make the synchronous movement. As a result, the purposes of equally distributing the magnetic damping force and exactly controlling the magnetic damping force can be achieved.

What the invention claimed is:
1. A magnetic damping device comprising:
   a) a frame;
   b) a load wheel;
   c) a magnetic device having:
      i) two arched plates including a first arched plate and a second arched plate, each of the two arched plates has a plurality of magnets located thereon; and
      ii) a connection shaft connected to the frame, a first end of the first arched plate and a first end of the second arched plate are pivotally connected to the frame by the connection shaft; and
   d) a damping adjusting mechanism having:
      i) a rotation shaft being rotatable between first and second positions;
      ii) a rotation plate fixed on the rotation shaft; and
      iii) two adjustable rods, a second end of the each of the two arched plates is adjustably connected to the rotation plate by one of the two adjustable rods, a first rod end of each of the two adjustable rods is pivotally connected to the rotation plate, a second rod end of each of the two adjustable rods is pivotally connected to a second end of one of the two arched plates,
   wherein, when the rotation shaft rotates between the first and second positions, the rotation shaft rotates the rotation plate, the rotation plate controls a movement of the two adjustable rods, the two adjustable rods selectively moving the two arched plates inwardly and outwardly thereby selectively adjusting a size of a space located between the plurality of magnets and the load wheel, wherein each adjustable rod of the two adjustable rods comprises:
   a) two connection rods, a first connection rod of the two connection rods has a rod end having first rod threads wound in a first direction and a second connection rod of the two connection rods has a rod end having second rod threads wound in a second direction opposite the first direction; and
   b) a dual-side nut located between the two connection rods and having a first threaded nut end having first nut threads corresponding to the first rod threads and a second threaded nut end having second nut threads corresponding to the second rod threads,
   wherein a length of each adjustable rod is selectively lengthened and shortened by rotating the dual-side nut.
2. The magnetic damping device according to claim 1, further comprising a motor connected to the rotation shaft.
3. The magnetic damping device according to claim 1, further comprising a wheel and a steel rope, the steel rope selectively controlling a simultaneous rotation of the wheel, the rotation shaft, and the rotation plate.

* * * * *